US009509696B1

(12) United States Patent
Doyen et al.

(10) Patent No.: US 9,509,696 B1
(45) Date of Patent: Nov. 29, 2016

(54) SYSTEMS AND METHODS FOR IMPLEMENTING ADVANCED COOPERATION BETWEEN MULTIPLE RELATED COMPANIES FOR EMPLOYEE ACCESS TO INTER-COMPANY RESOURCES

(71) Applicant: ROCKWELL COLLINS, INC., Cedar Rapids, IA (US)

(72) Inventors: William George Doyen, Annapolis, MD (US); Kyle Hawver, Middle River, MD (US); C. Couglas Gillikin, Annapolis, MD (US); Tim K. Ryan, Pasadena, MD (US)

(73) Assignee: Rockwell Collins, Cedar Rapids, IA (US)

( * ) Notice: Subject to any disclaimer, the term of this patent is extended or adjusted under 35 U.S.C. 154(b) by 303 days.

(21) Appl. No.: 14/309,872

(22) Filed: Jun. 19, 2014

(51) Int. Cl.
H04L 29/06 (2006.01)
(52) U.S. Cl.
CPC .................... *H04L 63/10* (2013.01)
(58) Field of Classification Search
CPC .............................. H04L 29/06; H04L 63/10
USPC ......................................................... 726/3, 4
See application file for complete search history.

(56) References Cited

U.S. PATENT DOCUMENTS

| 4,845,625 | A | * | 7/1989 | Stannard | ............... | G06Q 10/06 |
| | | | | | | 705/5 |
| 2006/0248599 | A1 | * | 11/2006 | Sack | ................... | G06F 21/6227 |
| | | | | | | 726/27 |
| 2008/0021746 | A1 | * | 1/2008 | Mogler | ................. | G06Q 10/02 |
| | | | | | | 705/5 |
| 2012/0203630 | A1 | * | 8/2012 | Goel | .................... | G06Q 10/02 |
| | | | | | | 705/14.49 |

* cited by examiner

Primary Examiner — Kambiz Zand
Assistant Examiner — Benjamin Kaplan
(74) Attorney, Agent, or Firm — Ronald E. Prass, Jr.; PRASS LLP

(57) ABSTRACT

A system and method are provided for implementing improved access to inter-company resources among related companies in a same industry, including a mechanism where airline aircrew members and other employees, including pilots, cabin flight crew and others can be validated as to eligibility to participate in cabin access programs, using automation and applying various rules and features. The disclosed schemes expand upon the currently-fielded CASS service to cover two additional groups of currently-unserved customer populations within the airline industry thereby availing those additional groups of benefits equivalent to those provided to pilots and cockpit aircrew by the CASS service. The two groups include: (1) airlines and other air carriers, including regional air carriers and business aviation entities and organizations, as well as other currently non-participating Twelve-Five Standard Security Program (TF-SSP) entities and organizations; and (2) other airline employees including non-pilot cabin crew members, dispatchers and other ground-based airline employees.

21 Claims, 3 Drawing Sheets

SYSTEMS AND METHODS FOR IMPLEMENTING ADVANCED COOPERATION BETWEEN MULTIPLE RELATED COMPANIES FOR EMPLOYEE ACCESS TO INTER-COMPANY RESOURCES

BACKGROUND

1. Field of the Disclosed Embodiments

This disclosure relates to systems and methods for providing improved access to inter-company resources among related companies in a same industry, including an improved mechanism where airline aircrew members and other employees, including pilots, cabin flight crew and others can be validated as to eligibility to participate in cabin access programs, using automation and applying various rules and features.

2. Related Art

In many industries today, there are increased efforts toward inter-corporation cooperation when such cooperation may prove mutually beneficial to the participating corporations, companies, organizations or entities. In such scenarios, it is generally the mutual benefit between the participating corporations, companies, organizations or entities in which neither of the participating corporations, companies, organizations or entities achieves some significant advantage over the competitors with whom they choose to cooperate. In other words, any agreements for cooperative sharing of corporation, company, organization or entity resources will likely be predicated on some definable quid pro quo as between the participating corporations, companies, organizations or entities. Each corporation, company, organization or entity will more likely be willing to participate in some cooperative venture based on an assurance that the benefit as between it and other corporations, companies, organizations or entities will be reasonably equal.

As an example of the above-discussed inter-corporation cooperation, the aviation industry may provide a reasonable model that is subject to review and potentially to improvement. Currently, those familiar with the aviation industry understand that frequently pilots and cabin crew may be required to travel to specified locations (airports), which may be at some distance from their domiciles, to perform their jobs as required by the airlines that employ them. Separately, there may be instances in which particular pilots and/or cabin crew may bid a line that requires them to "deadhead" from a point of arrival for one scheduled evolution to a separate point of departure for a next scheduled evolution. As such, there are in-place scenarios for facilitating the availability of airline aircrew member transport that a particular airline may choose to afford to its employees, but which may be limitedly available in certain instances based on open seat availability.

As a benefit to its employees, many of the major airlines provide employees, and employee family members, an opportunity to travel space available between destinations. The scenario often works well when the travel plans of any particular individual are not time-constrained. In situations, however, where pilots and cabin crew must attempt to make arrangements to get from point A to point B on their own to be available for required airline duties, non-availability of seating on the airline that employs the individual pilot or cabin crew member, scheduling problems and myriad other logistic issues may require those pilots and/or cabin crew members to make extensive arrangements in order to assure themselves of being in a particular place at a particular time to assume their actual flight duties.

This flexibility in being able to avail oneself of one's own choices where the individual may wish to live, while maintaining an ability to travel economically, often at no cost, to their appointed place of duty, is a generally recognized benefit of airline employment. In order to facilitate this flexibility, airlines typically enter into cooperative agreements that allow them, in a mutually beneficial manner, to reduce costs, streamline pilot and cabin crew travel times and thereby to expand the allowable flexibility in the living arrangements of certain of their employees while ensuring availability of those employees to perform the required duties.

Currently, a service is provided among participating air carriers that is known as Cockpit Access Security System or CASS. The CASS service provides a relatively easy accessibility verification scheme made available for pilots of participating air carriers to allow the admission of another airline deadheading pilot to a cockpit jump seat, where available, for transport to a destination airport. The CASS Hosted service is advertised as a configuration that eliminates cost of individual airline internal application development. The CASS service is approved and regulated by the Federal Aviation Administration (FAA) and Transportation Security Administration (TSA) for use among participating air carriers in the United States. More broadly, however, the CASS service is used by over 85 airlines worldwide. The CASS service provides the participating airlines with an ability to afford their cockpit aircrew members the valuable freedom of jump-seat travel to facilitate operating flexibility. Participating air carriers widely employ the service to save money, increase security, and boost personnel efficiency. No longer do cockpit aircrew members necessarily need to compete with other airline standby passengers when traveling to their next destination, a scenario which was often time consuming and frustrating for those individual cockpit aircrew members. For those air carriers operating within the CASS service coverage, airport gate agents are provided with an ability to query the personal records of airline employees, simply verifying their identity and credentials through one or more network-centric communications pathways.

Participating air carriers may today choose between two CASS configurations. With a distributed configuration, airlines maintain an onsite personnel database. ARINC (now Rockwell Collins) also offers a hosted configuration that air carriers may be afforded an opportunity to access through a directed secure communication connection.

SUMMARY OF THE DISCLOSED SUBJECT MATTER

The CASS service has proven itself highly effective in increasing a capacity for reasonably assured transport of individual cockpit aircrew members among cooperating air carriers often to the mutual benefit of the participating air carriers who reap benefits from the flexibility afforded to them by the system in pilot satisfaction and pilot availability. Participation with the CASS service is limited in its participation to those air carriers that choose to avail themselves, at a cost, of the service. Each air carrier must determine, according to its business practices and its desire for a quid pro quo, a cost-effectiveness of participating in this program. While this limited participation may be viewed as a disadvantage, even such limited participation provides cooperating advantages between participating airlines. One such cooperating advantage is that aircrew or more efficiently moved between positions. A second such cooperating advantage is that, in scenarios, a "spare" pilot may be provided to enhance flight safety. Regardless, the CASS service provides a model that may be used by other industries particularly as that model can be expanded to be more inclusive of greater populations of employees associated with any particular corporation, company, organization or entity in an industry that may desire to cooperate with certain of its competitors to a mutual benefit.

Based on a model provided by the currently-available CASS service, it may be advantageous to expand the accessibility and capabilities of a service modeled on the CASS service to be more inclusive regarding an expanded population of airline employees, and/or to otherwise extend the model to cooperating corporations, companies, organizations and/or entities that may choose to share resources along the model provided by the air carriers participating in the CASS service.

Exemplary embodiments of the systems and methods according to this disclosure may provide an expanded capacity for air carriers, and other industries, to participate in a CASS-like service that may prove mutually beneficial to the participating air carriers or other industry corporations, companies, organizations or entities.

Exemplary embodiments may provide a service that expands upon the capabilities of the current CASS service to cover two additional groups of currently-unserved customer populations within the airline industry thereby availing those additional groups of benefits equivalent to those provided to pilots and cockpit aircrew by the CASS service.

In embodiments, the first of the two additional groups to which an umbrella provided by the disclosed system service may be expanded to cover are airlines and other air carriers, including regional air carriers and business aviation entities and organizations, as well as other currently non-participating Twelve-Five Standard Security Program (TFSSP) entities and organizations.

In embodiments, the second of the two additional groups to which an umbrella provided by the disclosed system service may be expanded to cover are other airline employees including non-pilot cabin crew members. This second group may be further expanded to include dispatchers and other ground-based airline employees as well.

Exemplary embodiments may additionally provide a capacity by which a particular derivative benefit may be provided to participating organizations and entities based on an ability to expand particular groups of participating databases to which the system may provide access, including so-called "black lists."

Exemplary embodiments may provide a data collection capability in order that increased stakeholder visibility is made available regarding their own participation and that participation of the other cooperating stakeholders in a particular industry space.

Exemplary embodiments may enhance cooperation between airlines, and other closely-situated industry competitors that wish to avail themselves of a mutually beneficial cooperating capability for access of "other company" employees to access-controlled areas of the participating corporation, company, organization or entity.

Exemplary embodiments may provide additional assurances to individual aircrew members of a streamlined process by which to more effectively and efficiently transit from one particular site to another particular site to perform required flight duties.

In an airline scenario, additional flexibility may be provided by opening to airline employees and other cabin crew access to currently un-used cabin jump seats that require certification that individual participants in the program have been provided with the requisite training to travel in what the airlines commonly referred to as "door opener" jump seats, generally at the front and the back of a particular airline cabin.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for providing improved access to inter-corporation resources among related corporations, companies, organizations and or entities in a same industry space, including an improved mechanism where aircrew members and airline employees, including pilots, cabin flight crew and others can be validated as to eligibility to participate in cabin access programs using automation and applying various rules and features, will be described, in detail, with reference to the following drawings, in which.

DESCRIPTION OF THE DISCLOSED EMBODIMENTS

Figure 1:
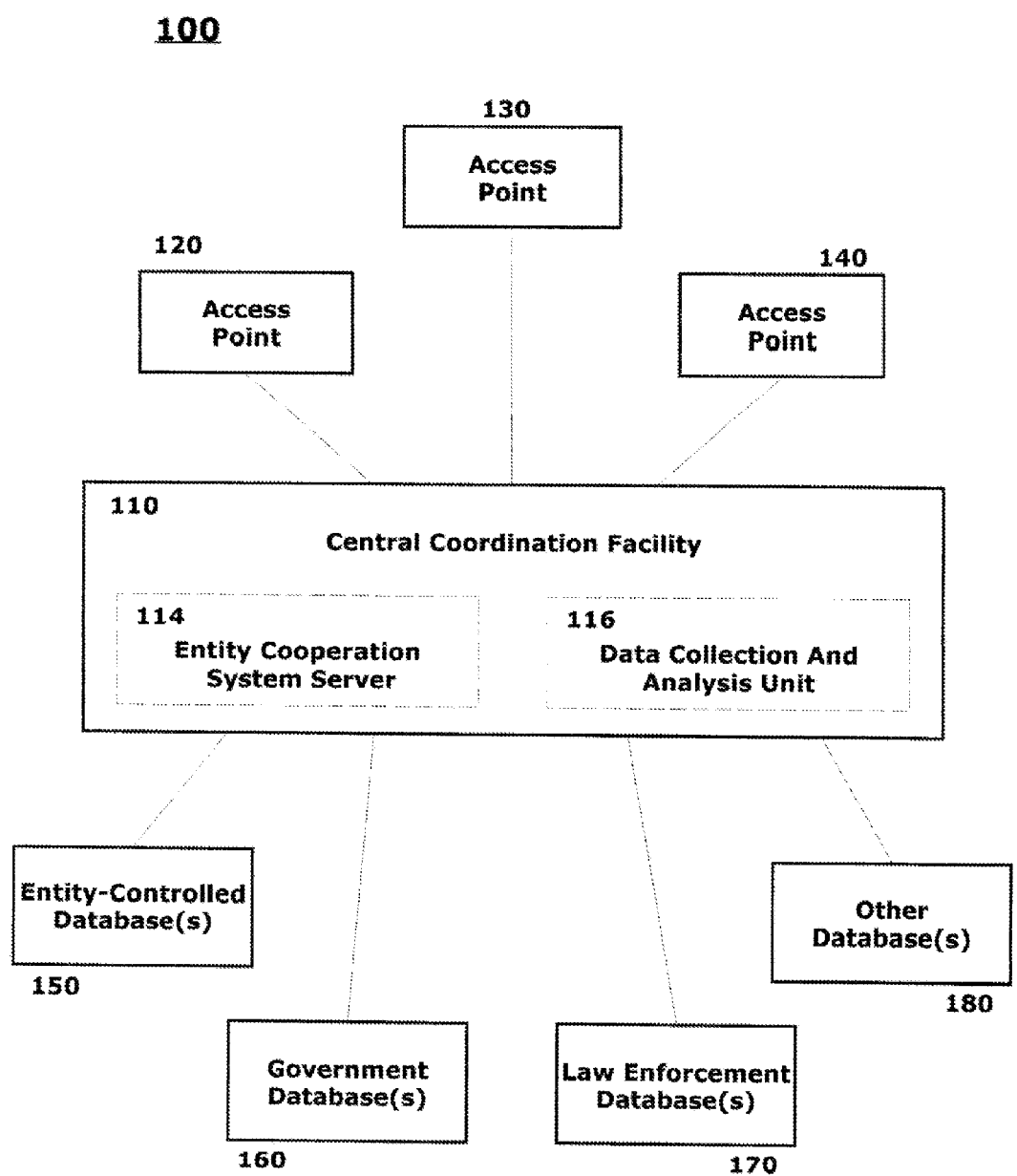
FIG. 1 illustrates an exemplary overview of an operating environment in which improved inter-company access clearance schemes may be implemented according to this disclosure.

The disclosed systems and methods for providing improved access to inter-corporation resources among related corporations, companies, organizations or entities in a same industry space, including a mechanism where aircrew members and airline employees, including pilots, cabin flight crew and others can be validated as to eligibility to participate in cabin access programs using automation and applying various rules and features, will generally refer to this specific utility for those systems and methods. Exemplary embodiments will be described in this disclosure as being particularly adaptable to use in an advanced employee ride-sharing scenarios among participating air carriers to the mutual benefit of those air carriers. These descriptions should not be interpreted as specifically limiting the disclosed schemes to any particular configuration of a networked communicating system for implementing advanced cooperation opportunities for airline employee transportation among participating air carriers. In fact, the systems and methods according to this disclosure may be equally applicable to any inter-corporation, company, organization or entity automated or semi-automated security and access clearance scheme among cooperating entities in any industry space. Any ability to ascertain, for example, by one corporation, company, organization or entity a qualification matrix for access clearance for an employee of a second corporation, company, organization or entity via some third-party central coordination facility, acting as an individual employee central clearing house, with an appropriate scheme for more efficiently providing information on a particular other company employee's level of qualification or level of access, is contemplated as being covered by this disclosure.

Specific reference to, for example, the above-discussed CASS service and the particular scenario in which that system has proven effective for the limited clearance of individual airline pilots and flight deck personnel for passage in the jump seat of another air carrier's aircraft as providing a particular example of a model system should not be considered as limiting this disclosure. The disclosed schemes do more than simply expand the above-discussed CASS service in providing enhanced accessibility. The described embodiments should be understood as being exemplary only, and not limiting the disclosed schemes, in any manner, to any particular class of access control units or processes, or to any particular communication link or protocol for implementing the disclosed schemes.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

The CASS service, in a current installation, is essentially limited to clearing only cockpit accessible aircrew (pilots) for flight in the jump seat of another air carriers airline via a particular streamlined automated clearance procedure. The network supporting the CASS service, however, provides a significant capacity for growth, particularly because it is in-place, with the required central coordination facility and network communication backbone, at this time. In installations, the disclosed schemes propose to provide a series of additional unforeseen capabilities in an airline access sharing procedure, which may be applicable to other industries as well, and a supplemental capability by which data regarding such flight sharing among air carriers may be collected and analyzed to determine relative benefits and costs to individual air carriers of providing such a service.

Beyond certain surface similarities with the CASS service, and an ability to leverage familiarity with the this service and such an in-place infrastructure, the disclosed schemes may generally incorporate a widely expanded capacity for implementing advanced accessibility and data sharing for business decision-makers at air carriers, and in other industries. As will be discussed specifically in greater detail below, the disclosed schemes may economically provide a service to air carriers, and other corporations, companies, organizations and/or entities that do not need to rely on developing an internal access control and tracking methodology and that will benefit from an individualized analysis of a result of the access control that the disclosed systems and methods may provide.

The disclosed cooperation schemes may be usable to establish previously unavailable relationships between various air carriers, or between various competitors in any industry space. Details of those relationships may be quantified and specifically defined according to the disclosed schemes. Certain scope and limitations to the cooperating engagements (according to potential contractual obligations) may be defined under the disclosed schemes. In the airline scenario, for example, a large airline or air carrier may require that, in exchange for letting only pilots from a smaller airline into its system, all pilots, cabin crew, dispatchers and other employees of the large airline or air carrier be permitted on the smaller airline. Separately, some level of compensation may be established as between dissimilarly placed corporations, companies, organizations or entities in a particular industry space according to, for example, the relative benefit that one of those entities may derive over access to the equipment of another of the entities.

Focusing on the airline scenario again, with the "reciprocal" agreements in place pilots, cabin crew and other employees of a first air carrier may present themselves at the gate of second cooperating air carrier. The gate agent for the second cooperating air carrier may then be able to access the system using a standard web-based application. After entering relevant information regarding the pilot, cabin crew member, or other employee of the first air carrier into the system at a standard or dedicated terminal, the disclosed scheme may then apply any applicable rules regarding participation established by either of the first air carrier or the cooperating second air carrier as a first level review of that individual pilot, cabin crew member or other employee to participate in the cooperative program between the first air carrier and the second cooperating air carrier. Additionally then, further searches may be undertaken according to the disclosed schemes using algorithms that may include, for example, government-required or law enforcement standard vetting of the individual to be granted access to transport on the second air carrier's equipment. Such vetting may be appropriate because certain up-to-date information regarding an accessibility of the individuals presenting themselves for clearance and transportation with the second air carrier may be incomplete or otherwise limitedly available.

In embodiments, once a complete package of information on the individual associated with the first air carrier requesting transportation on the second air carrier is compiled, that package of information may be routed, in the form of a request to the first air carrier with which the individual at the gate is alleged to be employed. That first air carrier may validate that the individual in question is one of its employees and approve the requested travel according to any limitations in the cooperating agreement between the first air carrier and the second air carrier. Such approval provided by the first air carrier may be routed via the central coordination facility overseeing the data exchange back to the second air carrier's requesting gate agent. Throughout the disclosed process, tracking data may be collected by the central coordination facility and provided, as agreed, to enable all stake holders to assess the benefits and liabilities of their individual participation in the program in effort to aid the stakeholders in making better and more informed business decisions regarding their participation.

The disclosed schemes may provide a number of advantages over any cooperating access control system that is currently available as enumerated, in part, below. An additional level of individual clearance for access may be provided in the capacity of the disclosed schemes to automatically query multiple publicly-accessible databases, including those mandated by overarching government or law enforcement requirements, e.g., government-generated "No Fly" lists or other entity-controlled "Black' lists for verification.

Individual negotiating points, and contractual cooperation, may be based on a number of factors that can be tracked. These factors may include, for example, sorting access by region, air carrier, individual, job title or other algorithm based sorting criteria. White lists may be established to streamline individual access and access authorization verification. Additional security features may be commonly established among participating air carriers, or otherwise participating corporations, companies, organizations and/or entities to provide ease of image identification and/or differentiation. These additional security features may include, for example, water marks on individual employee identification credentials that may establish, for visual inspection, an access level for the individual. In the airline scenario, such differentiation may include "Authorized For Cockpit/Cabin Access," "Authorized For Cabin Access Only," "Authorized For Door Opener Jump Seat Access" and/or like individual discriminators. In addition to water marks, commonly-established border colors may be provided around a picture image of the individual employee. Image flashing may be additionally or separately employed as well. In this manner, available seating on a particular aircraft may be optimized or more effectively employed based on known criteria for individual participants including positioning of pilots and/or cabin crew in seating that is generally restricted as to its occupancy, and that often goes unused.

In addition to individual authorizations for positions that a particular individual may occupy, other discriminators may be provided that may, for example, establish some level of flight priority assignment for the individual. In other words, even in a best case scenario, any air carrier that an individual may be trying to avail himself or herself access to may not be able to provide. Levels of cooperating availability may be established to indicate, for example, that one particular group of individuals should be afforded a "Must Fly" status, while another group of individuals may be afforded a "Space Available" status, or other like discriminators.

Also, the disclosed schemes may provide some level of routing assistance to the individual from the first air carrier seeking transportation on the second air carrier. An example as to how this may be implemented may occur when an individual desires transport from a particular departure point to a particular destination, but there are no direct flights. The system may advise the second carrier gate agent to, in turn, advise the individual that, in the absence of a direct flight, routing may be provided according to a particular schedule, via some intermediate destination. The individual seeking transportation may then decide whether such circuitous routing is acceptable or whether the individual needs to make other arrangements or provide other information to his or her employer regarding, for example, non-availability.

The disclosed schemes may make predictive decisions based on historical analysis of issues such as, for example, a typical passenger loading and/or a typical seat availability. The predictability analysis may apply a particular algorithm to a historical database supplemented by a currently-anticipated passenger loading to establish a predictable level of success for the individual in getting to a particular destination, potentially provided as a percentage chance of success such that the individual may make decisions regarding next steps, or alternatives arrangements for access/transport. The percentage chance of success may be bounded by an individual's required window for a time of arrival at a particular destination that the system may generate as a recommendation regarding the individual proceeding according to an alternate plan potentially by a transport on another participating air carrier. Particularly in instances where a participating air carrier is subject to irregular and/or not-precisely-scheduled operations, currently-available schedules for particular flights may be provided via the disclosed schemes in an effort to ensure that the individual's particular travel requirements are met according to a least disruptive route, which may not have been otherwise obvious in given travel scenarios.

An advantage of participation in the disclosed schemes is that feedback may be made available to individual air carriers as to their individual pilot, cabin crew or other employee current location based on approvals/requests. Statistics may be captured and provided in order that stake holders may be able to value their participation in the system. Such statistics may include whether a cheapest fare for a flight taken was used, as well as an assessment of air miles flown, segments flown, crews flown, numbers of flight-mile seats used and by which air carriers. These statistics may aid in valuing an individual air carrier's ongoing unlimited participation in the program or on whether certain additional restrictions may need to be imposed to formulate a reasonable quid pro quo for participation. With full implementation of the disclosed scheme, a "new economy" may be implemented to provide some ability to manage ceiling thresholds for participants. Participants may be afforded the data required to trade accrued "value" between customers, with an ability to buy, trade, save and sell "tokens" of the value.

Information from the disclosed schemes regarding individual participants at the gate may be collected and verified according to the above discussion to (1) manage reciprocal agreements; (2) support providing some symmetry to current asymmetric agreements and/or usage (for example, to ensure value that a large airline may require a small airline to accept all types of employees while only supporting the small airline's pilots). Standard algorithms may be employed to collect and standardize data across the industry allowing for the development of blanket policies for cooperative agreements and to determine occasions of individual avoidance, e.g., set criteria may be checked to routinely avoid individuals improperly taking advantage of the system. An intent of the disclosed schemes may provide an overarching system to aid in reducing fraud, or improper advantage being taken in a less regulated system, e.g., using a reasonable business benefit for improper personal use, like vacations, based on an evaluation of regional employment, times of employment, and/or airports of origin and destination.

FIG. 1 illustrates an exemplary overview of an operating environment 100 in which improved inter-company access clearance schemes may be implemented according to this disclosure. As shown in FIG. 1, the exemplary operating environment 100 may encompass myriad lines of communication (wired or wireless) between a central coordination facility 110, acting as a type of central clearing house, and a number of widely dispersed nodes.

The widely dispersed nodes may include a plurality of access points 120,130,140, which may be broadly geographically dispersed for providing an ability for a user associated with Entity A to communicate with the central coordination facility 110 in verifying access of an employee from Entity B to Entity A's equipment, spaces and the like. Assess points 120,130,140 may be, for example, mobile communicating and/or computing devices located at a position of a gate agent in an airport. The access points 120, 130,140 may provide the gate agent the opportunity to enter credential information for employees of an airline other than the airline by which the gate agent is employed to verify access of the other airline's employees to travel on the gate agents airline according to certain criteria. The central coordination facility 110 may perform the verification in the manner described above and return particular information regarding the access authorization to the gate agent.

The widely-dispersed nodes may also include a plurality of databases, including entity-controlled databases 150 (for example, airline or air carrier databases), government databases 160, law enforcement databases 170, and other databases 180. In general, these databases may include company-controlled employee registers, or other individual registration lists, including, for example, government-maintained "no-fly" or other access control lists, by which the user at the access point 120-140 may receive a coordinated confirmation, verification, or denial of access for the other company's employee to the company's equipment for reasons that may or may not be provided. The individual databases may be individually maintained by a specific entity to its access and security concerns with an intent of providing information regarding employee or other individual access authorization (or non-authorization) upon request. A premise behind the disclosed schemes is that no single entity may appropriately collect and hold all of the individual authorizing data that may be appropriately cross-checked with coordination among various databases. The other databases 180, for example, may include compiled "black" lists and "white" lists for individuals based on a data collection and learning algorithm executed by the central coordination facility 110 as it passes clearance and denial of clearance information back and forth between the databases and the access points.

The participating entities or stakeholders are advantageously aided by the intervening clearing house structure, in the form of the central coordination facility 110. The central coordination facility 110 may house a common set of information passing and data tracking algorithms that may include incorporation of certain industry-wide policies and may reference the various databases not only for individual identification and clearance information, but also for entity-established policies and/or cooperation agreements, all of which may be consulted to ultimately determine and provide to the access point a decision on access of any individual presenting himself or herself for a particular level of access to another entity's equipment. All of the efforts to coordinate real-time access authorization at a particular level may be coordinated through a dedicated entity coordination system server 114 acting essentially as a common gatekeeper for accepting requests and providing an access authorization or denial in a common and therefore familiar display at the requesting access point.

A separate advantage of the disclosed schemes resides in the capacity and capability of the central coordination facility 110 to collect information germane to the clearance of individuals over time including logging occasions of received access requests and results of those access requests including individual information determined from the various databases to fulfill or respond to those access requests. In the disclosed embodiments, the central coordination facility 110 may house a data collection and analysis unit 116 for collecting all manner of such information for later analysis and/or other purposes. Based on agreements with individual commercial entities, e.g., airlines and air carriers, feedback may be provided to those entities regarding a comparative value or a monetized advantage or disadvantage as to the entity's current level of cooperation in granting or denying access to its equipment among the entity's competitors. With this feedback, it is anticipated that an entity may make business decisions regarding modifying its rules and agreement for cooperation on access in the industry space.

In a normal course of operation in the airline industry, individual employees of Air Carrier D may present themselves to gate agents of Air Carriers E, F and G each manning an access point 120-140 to request transport on the next flight leaving that particular gate according to an access level represented on their Air Carrier D credentials. The gate agent need know no more than that Air Carrier D's employee is requesting transportation and need not be involved in the decision to permit such transportation. The gate agent simply enters the information via the access point and obtains a near-real time response that may include authorization, authorization subject to conditions, denial, denial with remarks, the remarks explaining briefly the reason for denial or perhaps otherwise providing other options for the Air Carrier D employee to reach his or her destination on yet another air carrier). It is anticipated that the Air carrier D employee will unquestioningly accept the determination according to Air Carrier D company policy removing the gate agent for the other air carrier from any liability for the decision when that decision may be a denial of access.

Unseen by the employee or the gate agent is the forwarding of the individual access request to the central coordination facility 110 with enough credential information for the Air Carrier D employee that the entity cooperation system server 114 may query appropriate and applicable databases, including Air Carrier D's program participation policies (blanket policies or specific policies for the air carrier whose gate agent made the request), to arrive at an automated access authorization for the particular flight. With a verification of the Air Carrier D's access/flight authorization, the central coordination facility 110 may forward appropriate access authorization information to the requesting access point and the Air Carrier D employee may be granted access to the flight.

Figure 2:
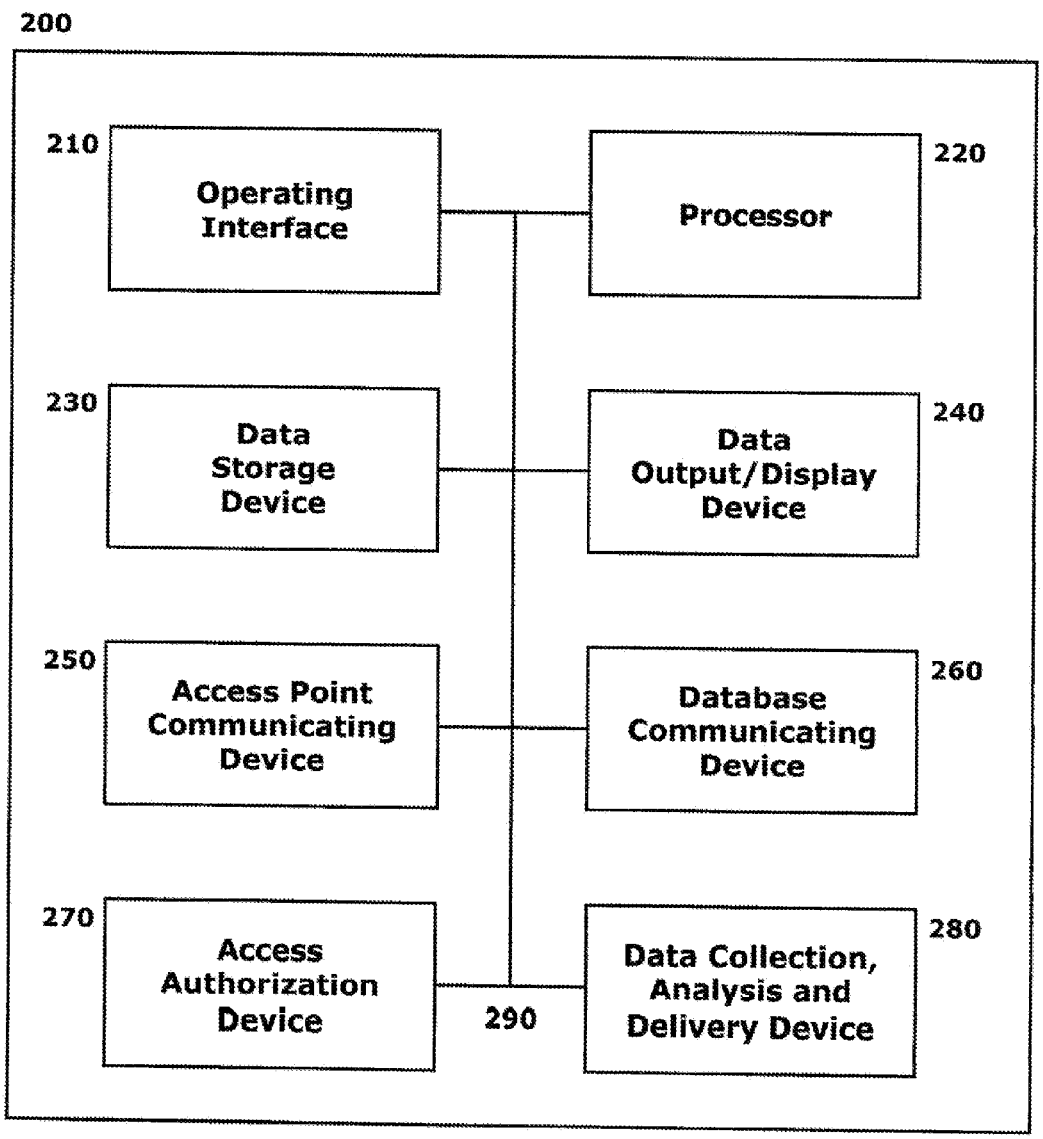
FIG. 2 illustrates an exemplary system, components of which may be housed in a central coordination facility, for implementing improved inter-company access clearance schemes according to this disclosure.

FIG. 2 illustrates an exemplary system 200, components of which may be housed in a central coordination facility, for implementing improved inter-company access clearance schemes according to this disclosure. The exemplary system 200 shown in FIG. 2 may be implemented as a unit in the central coordination facility (element 110 in FIG. 1), or may be implemented as a combination of system components associated with the central coordination facility, including as cloud-based processing and data storage components.

The exemplary system 200 may include an operating interface 210 by which a user may communicate with the exemplary system 200 for directing at least a mode of operation of the exemplary system 200 in implementing, adjusting or overseeing the disclosed clearance and data collection functions for transferring pre-determined information to an access point in response to an access request from the access point and for recording the access request and the access request response for later analysis. The operating interface 210 may allow a user to generate hard copy and electronic reports to be shared with one or more stakeholders desiring to track a value of their use of exemplary system 200. Inputs received in the exemplary system 200 via the operating interface 210 may be processed and communicated to any one of the many connected nodes in communication with the central coordination facility. The operating interface 210 may be a part or a function of a graphical user interface (GUI) mounted on, integral to, or associated with, the exemplary system 200. The operating interface 210 may alternatively take the form of any commonly known user-interactive device by which a user input and/or command are input to an automated processing system including, but not limited to, a keyboard or a touchscreen, a mouse or other pointing device, a microphone for providing verbal commands, or any other commonly-known operating interface device.

The exemplary system 200 may include one or more local processors 220 for carrying out the individual operations and functions of the exemplary device 200. The processor 220 may reference, for example, each access request and each response to an access request to monitor overall system stability and to facilitate granting access, at a particular level, in response to the access request. The processor 220 may initiate a database query via the database communicating device 260 to determine whether one of more of the stakeholders, including various database controlling entities has information to verify access for the individual requesting the access according to a particular set of negotiated rules, policies, procedures and/or quid pro quos, and that a particular level. The processor 220 may deliver an access authorization, access authorization with comment, access denial and/or an access denial with comment to an access point requesting the access for the individual via an access point communicating device 250.

The exemplary system 200 may include one or more data storage devices 230. Such data storage device(s) 230 may be used to store data or operating programs to be used by the exemplary system 200, and specifically the processor(s) 220 in carrying into effect the disclosed operations and functions. Data storage device(s) 230 may be used to store information regarding each access request and each response to an access request in order that the processor 220 in the exemplary device 200 may assess particular trends in the granting of access to, for example, employees of particular corporations, companies, organizations or entities to another entity's equipment for later detailed analysis and reporting to one or more of the entities upon request or according to some predetermined schedule. The data storage device(s) 230 may include a random access memory (RAM) or another type of dynamic storage device that is capable of storing updatable database information, and for separately storing instructions for execution of system operations by, for example, processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary system 200, or may be provided external to, and in wired or wireless communication with, the exemplary system 200, including as cloud-based storage and/or processing elements.

The exemplary system 200 may include at least one data output/display device 240, which may be configured as one or more conventional mechanisms that output information to a user, including, but not limited to, a display screen on a GUI associated with the exemplary system 200 to provide feedback to local technical and operating personnel the operations and functions of the exemplary system 200. The data output/display device 240 may be used to indicate to local technical personnel any information that may be usable by those local technical personnel in assisting in manually remediating issues as those issues may arise.

The exemplary system 200 may include at least one access point communicating device 250 by which the exemplary system 200 may communicate with individual remote access points, including, for example, access points manned by the agents in an airline transportation scenario, to support carrying into effect the operations and functions of the exemplary system 200. The exemplary system 200, via the access point communicating device 250, may accept access requests from individual remote access points and provide responses to those access requests to the individual remote access points.

The exemplary system 200 may include its own database communicating device 260, which may be used, for example, to provide separate communications to any one or more of a myriad of external and individual entity-controlled and other databases (as depicted in exemplary manner in FIG. 1) for collecting access authorization verification information from those databases and separately, any entity-controlled cooperating agreement rules that may affect a grant of authorization for access, or a level of authorization access for the individual requesting access at a particular access point.

The exemplary system 200 may include an access authorization device 270 and/or a data collection, analysis and delivery device 280. Each of the access authorization device 270 and the data collection, analysis and delivery device 280 may be a function of the processor 220 in communication with the data storage device 230, or may be a stand-alone device or unit within the exemplary system 200. When a stand-alone device or unit within the exemplary system 200, the access authorization device 270 may itself reference information from other components, including but not limited to the database communicating device 260 to facilitate determining authorization of access for the individuals presenting themselves at various access points and directing delivery of results of those determinations to the access points. As indicated in some detail above, the access authorization device 270 may reference many different databases and stored or available sets of rules for making the access authorization determinations. Separately, the data collection, analysis and delivery device 280 may collect data regarding access authorizations and access denials for analysis in order to provide stakeholders with a quantitative assessment of the value of their participation in the cooperative access control schemes. The data collection, analysis and delivery device 280 may, for example, on request, or according to a predetermined schedule, provide to an individual entity a comparative analysis of what benefit that entity is deriving from participation in comparison to the cost that that entity may incur in providing access (in an airline situation, transport) to employees of another entity.

All of the various components of the exemplary system 200, as depicted in FIG. 2, may be connected internally, and potentially to a central coordination facility, by one or more data/control busses 290. These data/control busses 290 may provide wired or wireless communication between the various components of the exemplary system 200, whether all of those components are housed integrally in, or are otherwise external and connected to, other components of an overarching access control system with which the exemplary system 200 may be associated.

It should be appreciated that, although depicted in FIG. 2 as an essentially integral unit, the various disclosed elements of the exemplary system 200 may be arranged in any combination of sub-systems as individual components or combinations of components, integral to a single unit, or external to, and in wired or wireless communication with, the single unit of the exemplary system 200. In other words, no specific configuration as an integral unit or as a support unit is to be implied by the depiction in FIG. 2. Further, although depicted as individual units for ease of understanding of the details provided in this disclosure regarding the exemplary system 200, it should be understood that the described functions of any of the individually-depicted components may be undertaken, for example, by one or more processors 220 connected to, and in communication with, one or more data storage device(s) 230, all of which may support operations in the associated access control schemes.

Figure 3:
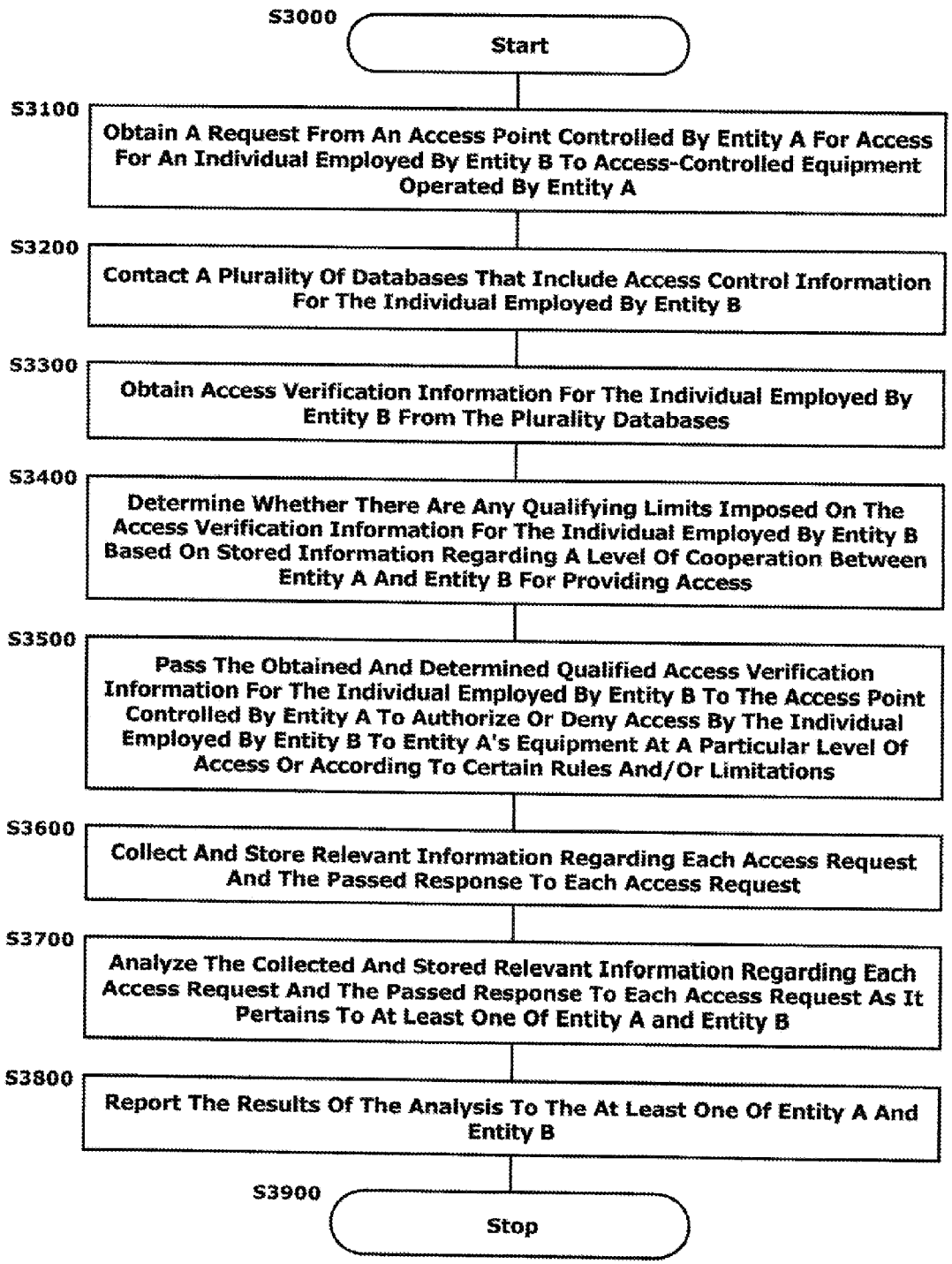
FIG. 3 illustrates a flowchart of an exemplary method for implementing improved inter-company access clearance schemes according to this disclosure.

The disclosed embodiments may include an exemplary method for implementing improved inter-company access clearance schemes. FIG. 3 illustrates an exemplary flowchart of such a method. As shown in FIG. 3, operation of the method commences at Step S3000 and proceeds to Step S3100.

In Step S3100, a request for access may be obtained from an access point control by Entity A to provide access for an individual employed by Entity B to access-controlled equipment operated by Entity A. Operation of the method proceeds to Step S3200.

In Step S3200, a plurality of databases may be contacted that include access control information for the individual employed by Entity B. The databases may be entity-controlled databases, government/law enforcement databases, or other databases that may contain pertinent information regarding an availability/level of access for the individual employed by Entity B to the access-controlled equipment operated by Entity A Operation of the method proceeds to Step S3300.

In Step S3300, access verification information may be obtained from the plurality of databases. Operation of the method proceeds to Step S3400.

In Step S3400, a determination may be made whether there are any qualifying limits imposed on obtained access verification information for the individual employed by Entity B based on stored information regarding a level of cooperation between Entity A and Entity B for providing such access. Operation of the method proceeds to Step S3500.

In Step S3500, the obtained and determined qualified access verification information for the individual employed by Entity B may be passed to the access point control by Entity A to authorize or deny access for the individual employed by Entity B to Entity A's access-controlled equipment. The access verification information may include a particular level of access for the individual and/or may include other rules or limitations with regard to the access provided to the individual. Operation of the method proceeds to Step S3600.

In Step S3600, o relevant information regarding each access request and the passed response to each access request may be collected and stored. Operation of the method proceeds to Step S3700.

In Step S3700, t the collected and stored relevant information regarding each access request and the passed response to each access request may be analyzed as it pertains to at least one of Entity A and Entity B. Operation of the method proceeds to Step S3800.

In Step S3800, a result of the analysis may be reported to the at least one of Entity A and Entity B, in order to allow one or more of the entities to determine their cost/benefit of being involved in the cooperative access scheme for other companies employees to their equipment. Operation of the method proceeds to Step S3900, where operation of the method ceases.

The disclosed embodiments may include a non-transitory computer-readable medium storing instructions which, when executed by a processor, may cause the processor to execute all, or at least some, of the functions that may be appropriate to implement the steps of the method outlined above.

The above-described exemplary systems and methods reference certain conventional communicating and/or computing components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objectives of the systems and methods according to this disclosure.

Those skilled in the art will appreciate that other embodiments of the disclosed subject matter may be practiced in integrating access control techniques using many and widely-varied system components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communication connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual access unit and each individual database that may individually reliably employ components of the disclosed system. This enables each access unit and/or database to enjoy the benefits of the disclosed embodiments even if any one of the large number of possible end-user nodes, or entities, do not need some portion of the described functionality. In other words, there may be multiple instances of the disclosed system each processing the content in various possible ways. It does not necessarily need to be one system used by all end-user nodes or entities. Accordingly, the appended claims and their legal equivalents should only define the disclosed embodiments, rather than any specific examples given.

We claim:

1. A system for implementing access control, comprising:
a first communicating device that is configured to communicate with a plurality of access control units, each of the plurality of access control units being configured to accept a user request to gain access to access-controlled equipment;
a second communicating device that is configured to communicate with a plurality of access control databases, at least one of the plurality of access control databases (1) being separately controlled by a respective individual entity and (2) containing information maintained by the respective individual entity for individual user access verification;
an access resolution device that is configured to
receive a user access request from one of the plurality of access control units via the first communicating device, the user access request including identifying information for a user associated with a first entity requesting to gain access to access-controlled equipment controlled by a second entity, the second entity controlling the one of the plurality of access control units generating the user access request,
query the plurality of access control databases, including at least an access control database separately controlled by the first entity, to collect information responsive to the user access request via the second communicating device,
reference stored information regarding limitations on access for the identified user based on agreements between the first entity and the second entity, and
forward access verification information for the identified user to the one of the plurality of access control units controlled by the second entity via the first communicating device; and
a data analysis device that is configured to
archive information regarding each user access request and the forwarded access verification information responsive to the each user access request,
analyze the stored information for at least one of a plurality of participating entities to generate use information for the at least one of the plurality of participating entities, and
forward a result of the analysis to the at least one of the plurality of participating entities.

2. The system of claim 1, the user access request including an indication of a level of access requested for the identified user.

3. The system of claim 2, the access verification information including an authorized level of access to the equipment of the second entity for the identified user.

4. The system of claim 1, the plurality of databases including at least one of a government-controlled database and a law enforcement database.

5. The system of claim 1, the agreements between the first entity and the second entity including conditions under which the first entity and the second entity cooperate for access of individuals associated with the first entity to the access-controlled equipment controlled by the second entity.

6. The system of claim 5, the analysis quantifying at least one of a cost and a benefit to at least one of the first entity and the second entity based on the cooperation.

7. The system of claim 1, each of the first entity and the second entity being an air carrier and the user access request being in a form of a transport for the identified user associated with the first entity on an aircraft operated by the second entity.

8. The system of claim 7, the user access request being received from an access control unit operated by a gate agent of the second entity and including information obtained from identifying employment credentials presented by the identified user associated with the first entity.

9. The system of claim 8, the access verification information including a limitation on seating in the aircraft that the identified user is authorized to occupy.

10. The system of claim 8, the access verification information including a proposed alternate travel scheme involving a third entity when transport of the identified user is not accommodated by the second entity.

11. A method for implementing access control, comprising:
receiving, with a processor, a user access request from one of a plurality of access control units, the user access request including identifying information for a user associated with a first entity to gain access to access-controlled equipment controlled by a second entity, the second entity controlling the one of the plurality of access control units generating the user access request;
forwarding, with the processor, a query to a plurality of access control databases, including at least an access control database separately controlled by the first entity, to collect information responsive to the user access request;
referencing, with the processor, stored information regarding limitations on access for the identified user based on agreements between the first entity and the second entity;
forwarding, with the processor, access verification information for the identified user to the one of the plurality of access control units controlled by the second entity;
archiving, with the processor, information regarding each user access request and the forwarded access verification information responsive to the each user access request;
analyzing, with the processor, the stored information for at least one of a plurality of participating entities to generate use information for the at least one of the plurality of participating entities; and
forwarding, with the processor, a result of the analysis to the at least one of the plurality of participating entities.

12. The method of claim 11, the user access request including an indication of a level of access requested for the identified user.

13. The method of claim 12, the access verification information including an authorized level of access to the access-controlled equipment controlled by the second entity for the identified user.

14. The method of claim 11, the plurality of databases including at least one of a government-controlled database and a law enforcement database.

15. The method of claim 11, the agreements between the first entity and the second entity including conditions under which the first entity and the second entity to cooperate for access of individuals associated with the first entity to the access-controlled equipment controlled by the second entity.

16. The method of claim 15, the analysis quantifying at least one of a cost and a benefit to at least one of the first entity and the second entity based on the cooperation.

17. The method of claim 11, each of the first entity and the second entity being an air carrier and the user access request being a request for transport of the identified user on an aircraft operated by the second entity.

18. The method of claim 17, the access request being received from an access control unit operated by a gate agent of the second entity and including information obtained from identifying employment credentials presented by the identified user.

19. The method of claim 18, the access verification information including a limit on seating in the aircraft that the identified user is authorized to occupy.

20. The method of claim 18, the access verification information including a proposed alternate travel scheme involving a third entity when transport of the identified user is not accommodated by the second entity.

21. A non-transitory data storage medium storing instructions that, when executed by a processor, cause the processor to execute the steps of method for implementing access control, the method comprising:
  receiving a user access request from one of a plurality of access control units, the user access request including identifying information for a user associated with a first entity to gain access to access-controlled equipment controlled by a second entity, the second entity controlling the one of the plurality of access control units generating the user access request;
  forwarding a query to a plurality of access control databases, including at least an access control database separately controlled by the first entity, to collect information responsive to the user access request;
  referencing stored information regarding limitations on access for the identified user based on agreements between the first entity and the second entity;
  forwarding access verification information for the identified user to the one of the plurality of access control units controlled by the second entity;
  archiving information regarding each user access request and the forwarded access verification information responsive to the each user access request;
  analyzing the stored information for at least one of a plurality of participating entities to generate use information for the at least one of the plurality of participating entities; and
  forwarding a result of the analysis to the at least one of the plurality of participating entities.

\* \* \* \* \*

UNITED STATES PATENT AND TRADEMARK OFFICE
CERTIFICATE OF CORRECTION

PATENT NO.           : 9,509,696 B1                       Page 1 of 1
APPLICATION NO.      : 14/309872
DATED                : November 29, 2016
INVENTOR(S)          : William George Doyen et al.

It is certified that error appears in the above-identified patent and that said Letters Patent is hereby corrected as shown below:

On the Title Page

Item (72) Inventors

Spelling of the third inventor's name reads:

C. Couglas Gillikin should read:

C. Douglas Gillikin

Signed and Sealed this
Thirty-first Day of January, 2017

Michelle K. Lee
*Director of the United States Patent and Trademark Office*